(12) United States Patent
Horiguchi et al.

(10) Patent No.: US 9,344,713 B2
(45) Date of Patent: *May 17, 2016

(54) PROJECTOR WITH THREE-DIMENSIONAL DISPLAY

(71) Applicant: SEIKO EPSON CORPORATION, Tokyo (JP)

(72) Inventors: Hirosada Horiguchi, Minowa-machi (JP); Hiroshi Yoshimoto, Suwa (JP); Tadashi Yamada, Chino (JP); Keiji Fukuhara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,120

(22) Filed: Jan. 15, 2015

(65) Prior Publication Data
US 2015/0124221 A1 May 7, 2015

Related U.S. Application Data

(63) Continuation of application No. 13/619,869, filed on Sep. 14, 2012, now Pat. No. 8,960,911.

(30) Foreign Application Priority Data

Sep. 27, 2011 (JP) ................................ 2011-211115

(51) Int. Cl.
*H04N 13/04* (2006.01)
*G03B 21/00* (2006.01)
(Continued)

(52) U.S. Cl.
CPC .......... *H04N 13/0497* (2013.01); *G03B 21/006* (2013.01); *G03B 21/2053* (2013.01);
(Continued)

(58) Field of Classification Search
CPC ... H04N 13/02; H04N 13/04; H04N 13/0459; H04N 13/0497; G03B 21/006; G03B 21/205; G03B 21/2053; G09G 3/003; G09G 3/342; G09G 3/3648

USPC .......... 353/7, 8, 84, 85, 88, 94; 359/618, 462, 359/464, 619, 630, 633, 670; 349/5, 7–9, 349/15–16; 348/743–747
See application file for complete search history.

(56) References Cited

U.S. PATENT DOCUMENTS 4,792,850 A * 12/1988 Liptoh ................ G02F 1/13471
348/51
5,608,294 A 3/1997 Derra et al.
(Continued)

FOREIGN PATENT DOCUMENTS

JP 10-501919 A 2/1998
JP 2002-533884 A 10/2002
(Continued)

OTHER PUBLICATIONS

Extended European Search Report dated Dec. 3, 2012 in application No. 12 18 6244.
(Continued)

*Primary Examiner* — Sultan Chowdhury
(74) *Attorney, Agent, or Firm* — Maschoff Brennan

(57) ABSTRACT

A projector includes a lamp that emits projection light to project 3D picture, in which a right eye image and a left eye image are represented in a time division manner, to an object, a synchronization signal transmission section which transmits shutter synchronization signal to glasses having a right eye shutter and a left eye shutter to control the opened state or the closed state of the right eye shutter and the left eye shutter, based on the signal indicating a displaying period of the right eye image and the left eye image of 3D picture, and a lamp drive section that supplies AC current having peak overlapping with a period when the right eye shutter of the glasses is in the opened state and peak overlapping with a period when the left eye shutter of the glasses is in the opened state to the lamp, based on the signal.

4 Claims, 9 Drawing Sheets

(51) Int. Cl.

| | | |
|---|---|---|
| *G03B 21/20* | (2006.01) | |
| *G03B 33/12* | (2006.01) | |
| *G03B 35/24* | (2006.01) | |
| *H04N 9/31* | (2006.01) | |
| *G09G 3/00* | (2006.01) | |
| *G09G 3/34* | (2006.01) | |
| *G09G 3/20* | (2006.01) | |

(52) U.S. Cl.
CPC ............... *G03B33/12* (2013.01); *G03B 35/24* (2013.01); *G09G 3/003* (2013.01); *G09G 3/20* (2013.01); *G09G 3/3406* (2013.01); *H04N 9/31* (2013.01); *H04N 9/3155* (2013.01); *H04N 13/0438* (2013.01); *H04N 13/0459* (2013.01); *G09G 2310/08* (2013.01)

(56) References Cited

U.S. PATENT DOCUMENTS

| | | | |
|---|---|---|---|
| 6,278,244 | B1 | 8/2001 | Hevinga et al. |
| 6,702,446 | B2 * | 3/2004 | De Vaan ............... H04N 9/3117 348/270 |
| 8,177,366 | B2 | 5/2012 | Lee et al. |
| 8,425,041 | B2 | 4/2013 | Schuck et al. |
| 8,444,275 | B2 | 5/2013 | Kurtz et al. |
| 8,487,917 | B2 * | 7/2013 | Han et al. ....................... 345/204 |
| 2007/0076175 | A1 | 4/2007 | Nakagawa et al. |
| 2010/0231697 | A1 | 9/2010 | Nakahata et al. |
| 2010/0231698 | A1 | 9/2010 | Nakahata et al. |
| 2010/0253920 | A1 | 10/2010 | Miyazawa |
| 2010/0328560 | A1 * | 12/2010 | Tanaka ................... G02B 27/26 349/9 |
| 2011/0019152 | A1 | 1/2011 | Shestak et al. |
| 2011/0074937 | A1 | 3/2011 | Nakhata |
| 2011/0090324 | A1 | 4/2011 | Mentz et al. |
| 2011/0157165 | A1 | 6/2011 | Jung et al. |
| 2011/0164191 | A1 | 7/2011 | Brown |
| 2011/0221871 | A1 | 9/2011 | Sakaniwa et al. |
| 2011/0267438 | A1 | 11/2011 | Yang et al. |
| 2012/0113169 | A1 | 5/2012 | Goo et al. |
| 2012/0120208 | A1 * | 5/2012 | Mao ................................ 348/54 |
| 2013/0002837 | A1 | 1/2013 | Yuno |

FOREIGN PATENT DOCUMENTS

| | | |
|---|---|---|
| JP | 2003-102030 A | 4/2003 |
| JP | 2008-103091 A | 5/2008 |
| JP | 2009-025436 A | 2/2009 |
| JP | 2009-232308 A | 10/2009 |
| JP | 2009-237302 A | 10/2009 |
| JP | 2010-217310 A | 9/2010 |
| JP | 2010-217311 A | 9/2010 |
| JP | 2011-120265 A | 9/2010 |
| JP | 2011-069963 A | 4/2011 |
| JP | 2013-012980 A | 1/2013 |
| WO | 95/35645 A | 12/1995 |
| WO | 00/38481 A | 6/2000 |
| WO | 00/40061 A1 | 7/2000 |
| WO | 02/32149 A2 | 4/2002 |
| WO | 2010/150973 A1 | 12/2010 |

OTHER PUBLICATIONS

Search Report dated Sep. 29, 2011 in application No. EP11175414.9.
Search Report dated Feb. 13, 2013 in application No. EP12192501.0.

* cited by examiner

PROJECTOR WITH THREE-DIMENSIONAL DISPLAY

RELATED APPLICATIONS

This application is a continuation of U.S. patent application Ser. No. 13/619,869, filed Sep. 14, 2012, which claims priority to Japanese Patent Application No. 2011-211115, filed Sep. 27, 2011. The foregoing applications are incorporated herein by reference.

BACKGROUND

1. Technical Field

The present invention relates to a projector displaying three-dimensional picture (a picture visible in stereoscopic view, referred to as 3D picture) and a technique improving the brightness of image perceived by a user through glasses for viewing 3D picture by a user.

2. Related Art

A display system displayable 3D picture has been known. In a case of displaying 3D picture using such a displaying system, a right eye picture and a left eye picture are sequentially displayed and are composited and displayed on the picture display device, and a user who appreciates 3D picture wears glasses (referred to as 3D glasses) for viewing 3D picture separating the right eye picture and the left eye picture. In JP-A-2009-25436, it is disclosed that a description that a right eye image and a left eye image are alternately displayed on the display screen and shutter glasses having a right eye liquid crystal shutter and a left eye liquid crystal shutter are used as 3D glasses. When the right eye image is displayed, the right eye liquid crystal shutter is opened and the left eye liquid crystal shutter is closed. When the left eye image is displayed, the right eye liquid crystal shutter is closed and the left eye liquid crystal shutter is opened.

In JP-T-10-501919 and JP-T-2002-533884, a description that a high pressure electric discharge lamp turn-on circuit which applies an AC lamp current to a high-pressure electric discharge lamp used as light source of the projector and turns-on the high-pressure electric discharge lamp has been disclosed. The high pressure electric discharge lamp turn-on circuit described in the JP-T-10-501919 and JP-T-2002-533884 includes a control unit overlapping an additional current pulse having a similar polarity to a polarity of the half wave at a termination time of half wave of each polarity of AC lamp current in order to reduce a flicker appearing in a projection image. Further, in the high pressure electric discharge lamp turn-on circuit in disclosed in JP-T-2002-533884, it is described that the control unit synchronizes with image writing signal.

However, in JP-T-10-501919 and JP-T-2002-533884, there is no mention of the point such that when 3D picture is displayed by a projector, improving of the brightness of image viewed through 3D glasses by a user and suppressing of the increase in lamp drive power used as a projection light source in the projector are compatible.

SUMMARY

An advantage of some aspects of the invention is to allow that improving of the brightness of image viewed through 3D glasses by a user and suppressing of the increase of lamp drive power used as a projection light source in the projector are compatible when a 3D picture is displayed by the projector.

According to an aspect of the invention, there is provided a projector including a lamp that emits projection light to project 3D picture, in which a right eye image and a left eye image are presented in a time division manner, to an object, a synchronization signal transmission section which transmits a shutter synchronization signal to a pair of glasses having a right eye shutter and a left eye shutter which are in an opened state or a closed state independently, to control the opened state or the closed state of the right eye shutter and the left eye shutter, based on a signal indicating a displaying period of the right eye image and the left eye image of the 3D picture, and a lamp drive section that supplies AC current having a peak overlapping with a period when the right eye shutter is in the opened state and a peak overlapping with a period when the left eye shutter is in the opened state to the lamp, based on the signal indicating the displaying period of the right eye image and the left eye image of the 3D picture.

According to such a projector, when displaying the 3D picture, improving of the brightness of the image viewed through 3D glasses by a user and suppressing of the increase of lamp drive power used as a projection light source in the projector are compatible.

It is preferable that, a phase with respect to the signal indicating a displaying period of the right eye image and the left eye image of the 3D picture of the peak of the AC current supplied by the lamp drive may be set so that a value obtained by a integrating for a product of a lamp brightness and the transmissivity of the right eye shutter or the left eye shutter in a predetermined period becomes maximum value.

In such a projector, the brightness of the image viewed through the 3D glasses by a user can be improved compared to a case where a phase with respect to the 3D picture signal of the peak of AC current supplied by the lamp drive section is not set so that the value obtained by a integrating for a product of the lamp brightness and the transmissivity of the right eye shutter or the left eye shutter in a predetermined period become maximum value.

It is preferable that, the lamp drive section decreases the lamp brightness in a period in which both of the right eye shutter and the left eye shutter of the glasses are in the closed state compared to a period in which either of the right eye shutter and the left eye shutter is in the opened state.

According to such a projector, a crosstalk can be decreased compared to a case where the lamp brightness is not decreased, compared to a period in which either of the right eye shutter and the left eye shutter is in the opened state, in a period in which both of the right eye shutter and the left eye shutter of the glasses are in the closed state.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Embodiment

Figure 1:
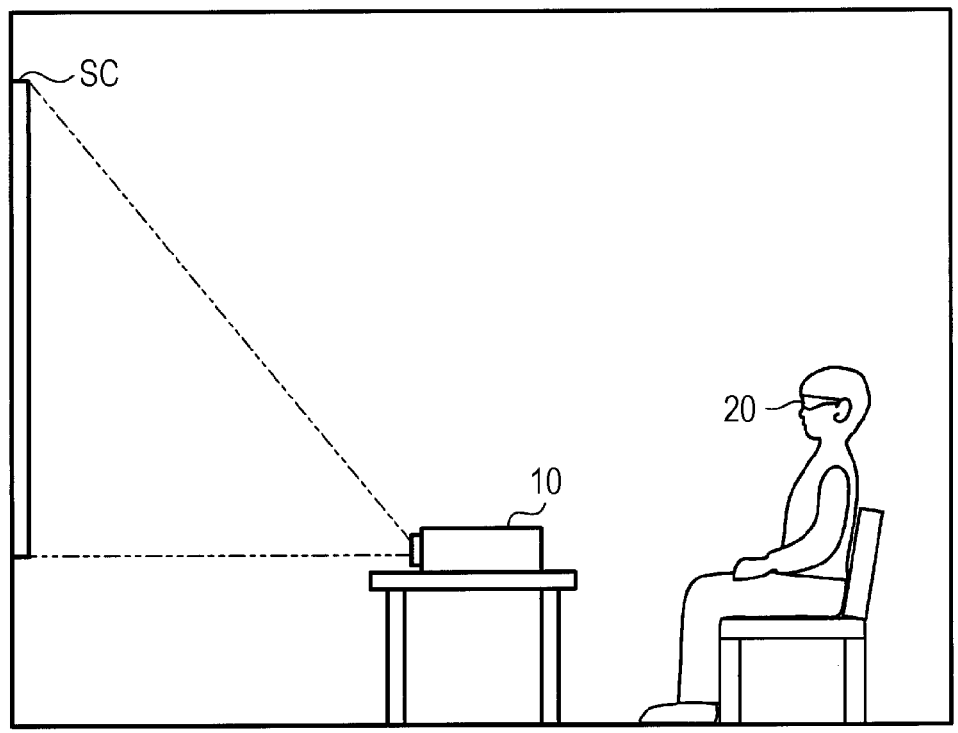
FIG. 1 is a schematic diagram illustrating the overall configuration of a display system according to an embodiment.

FIG. 1 shows a diagram illustrating the overall configuration of a display system 1 according to an embodiment. The display system 1 has a projector 10, glasses 20 and a screen SC. In example of FIG. 1, the projector 10 is a front projector that projects an image according to an inputted picture signal from in front of the screen SC to the screen SC. Further, the projector 10 may be a rear projector that projects an image from a rear side of the screen SC to the screen SC. In the embodiment, a picture indicating the picture signal inputted to the projector 10 refers to a 3D picture by which a right eye image (hereinafter, referred to as "right eye image") and an left eye image (hereinafter, referred to as "left eye image") are alternately represented using a time-division (that is, slip off in terms of time). Individual still image which constitutes 3D picture is referred to a frame. Accordingly, in a case of 3D picture, commonly, a right eye image and a left eye image are one frame repeated at intervals. Further, the picture referred to herein is stands for a motion picture mainly, but may be a still image. The screen SC is an example of an object providing a surface displaying a picture projected from the projector 10. Instead of the screen SC, a wall surface or the like may be used. The glasses 20 are 3D glasses for independently viewing a right eye image and a left eye image in the right eye and the left eye of the user wearing the glasses 20.

Figure 2:
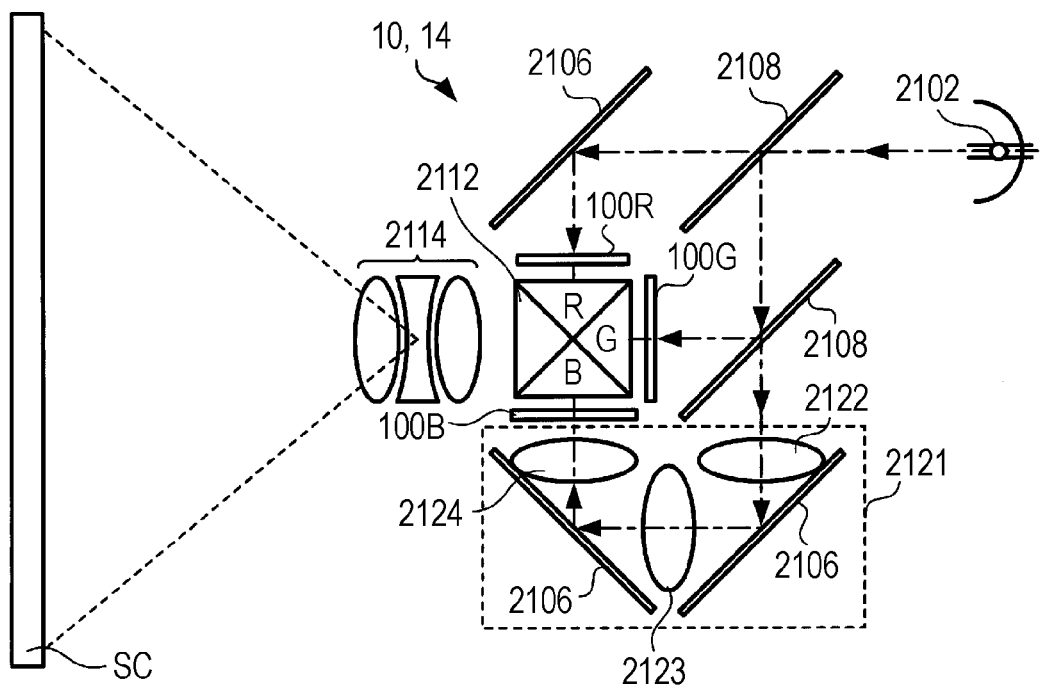
FIG. 2 is a plan view illustrating a configuration of a picture projection section of a projector.

FIG. 2 shows a plan view illustrating a configuration of a picture projection section (reference number 14 in FIG. 4) of the projector 10. In the example, the projector 10 is a three panel projector that a liquid crystal panels is used as a light valve for each color of RGB.

As shown in FIG. 2, the lamp unit 2102 having a high pressure electric discharge lamp such as an ultra high pressure mercury lamp as a white light source is installed in the inside of the projector 10. The projection light projected from the lamp unit 2102 is separated to three primary colors of R (red), G (green) and B (blue) by three mirrors 2106 and two dichroic mirrors 2108 which are disposed therein. The separated projection light is respectively led to a light valves 100R, 100G and 100B corresponding to each primary color. Further, since the light of B color is longer in the light path than light of other R color or G color, the light of B color is led through a relay lens 2121 having an incident lens 2122, a relay lens 2123 and an emission lens 2124 in order to prevent loss thereof.

In the projector 10, each of the light valves 100R, 100G and 100B is made from a liquid crystal panel in which the transmissivity may be set per pixel. Picture signals appointing gradation levels of the primary color components of each of the R color, G color and B color are supplied to light valves 100R, 100G and 100B and in accordance with the supplied picture signals, the light valves 100R, 100G and 100B are driven respectively. The light modulated by the light valves 100R, 100G and 100B is incident from three directions in a dichroic prism 2112. In the dichroic prism 2112, the light of R color and B color is reflected at 90 degree, light of G color goes straightly. Accordingly, image of each primary color are combined and thereafter, the combined color images are projected on the screen SC by a projection lens group 2114.

Further, in light valves 100R, 100G and 100B, since light corresponding to R color, G color and B color respectively is incident by the diachronic mirror 2108, there is no need to install a color filter. Further, while transmitted images of light valves 100R and 100B are reflected by the dichroic prism 2112 and then are projected, while the transmitted image of light valve 100G is projected as is. Accordingly, it is constituted such that a horizontal scanning direction by the light valves 100R and 100B is reversed with respect to the horizontal scanning direction by the light valve 100G and thereby an image which is reversed right to left is displayed. In addition, in FIG. 2, the liquid crystal panel consisted of light valves 100R, 100G and 100B is a transmission type and is constituted by a transmission type projector, but a reflective type may be used as the liquid crystal panel to constitute a reflective type projector.

Figure 3:
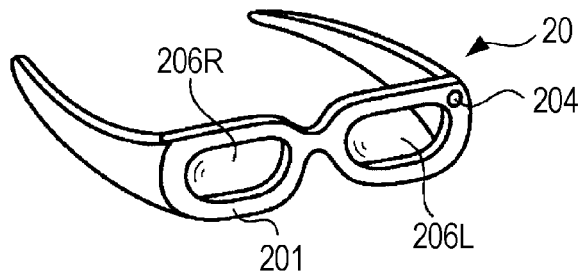
FIG. 3 is a diagram illustrating an example of an external appearance of glasses.

FIG. 3 shows a diagram illustrating the external appearance of the glasses 20. As shown in FIG. 3, the glasses 20 have a frame 201 and a right eye shutter 206R and a left eye shutter 206L are installed in the portion corresponding to lenses of the general glasses for vision correction. The right eye shutter 206R and the left eye shutter 206L are an example of a liquid crystal shutter and are opened and closed according to a shutter synchronization signal transmitted from the projector 10, which will be described later. Herein, if the right eye shutter 206R and the left eye shutter 206L are "open", it refers that transmissivity is in a level higher than a predetermined threshold value (for example, 5%), and if "closed", it refers that transmissivity is in a level lower than a predetermined threshold value (for example, 5%). Further, the glasses 20 have an infrared ray receiving section 204 installed on a front surface (that is, the surface toward the front of user when the glasses 20 are worn by a user) of the frame 201. The infrared ray receiving section 204 has for example, light receiving elements such as photodiodes and receives a shutter synchronization signal transmitted by infrared transmission from the projector 10.

Figure 4:
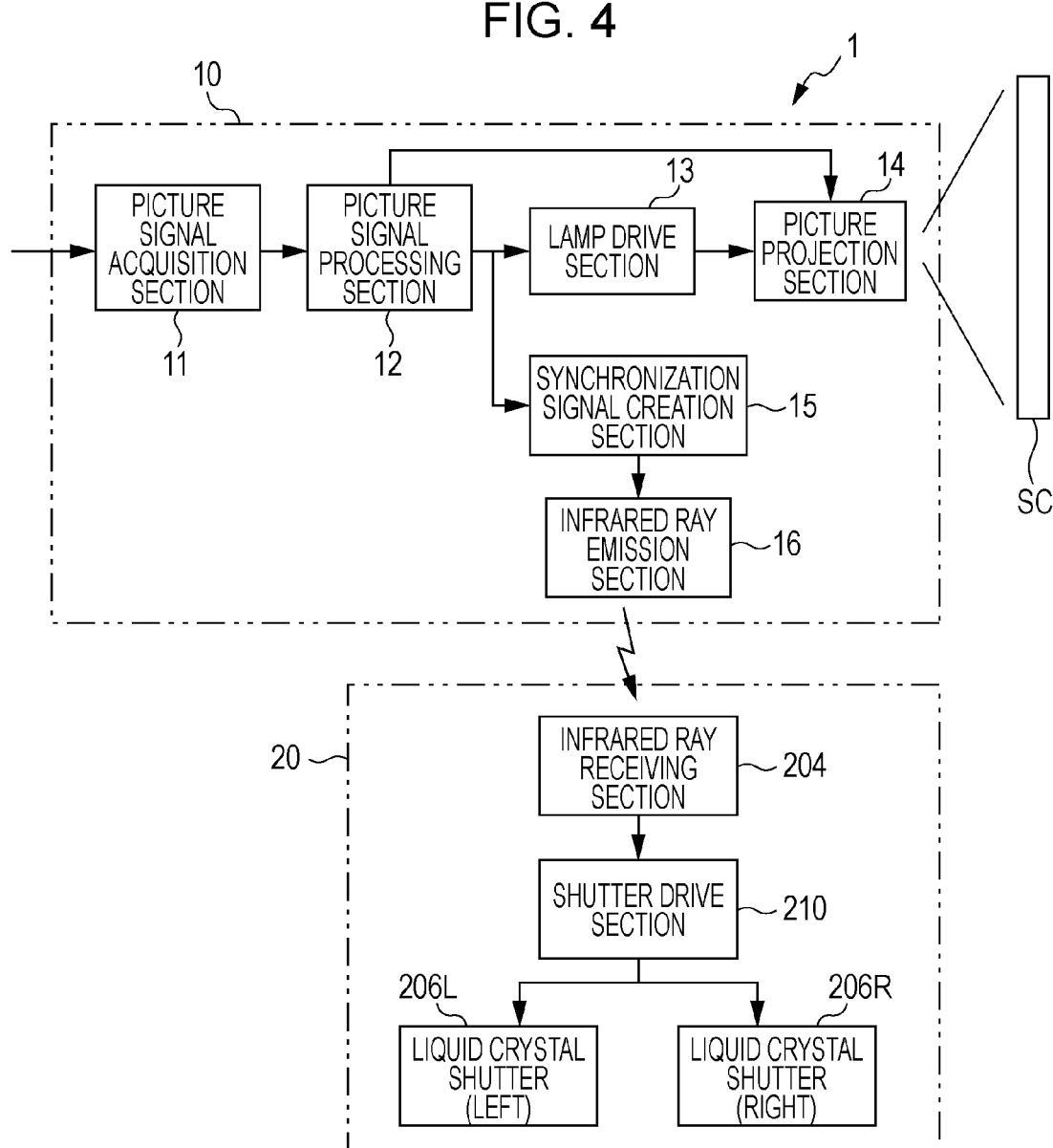
FIG. 4 is a block diagram illustrating a functional configuration of the displaying system.

FIG. 4 is a block diagram illustrating a functional configuration of display system 1 including the projector 10, the glasses 20 and the screen SC. As shown in FIG. 4, the projector 10 has a picture signal acquisition section 11, a picture signal processing section 12, a lamp drive section 13, a picture projection section 14, a synchronization signal creation section 15 and an infrared ray emission section 16. Functions of the picture signal acquisition section 11, the picture signal processing section 12, the lamp drive section 13 and the synchronization signal creation section 15 may be realized by executing a program stored in a storage device such as ROM (Read Only Memory) or hard disk by the operation processors such as CPU (Central Processing Unit).

The picture signal acquisition section 11 acquires picture signal from the external device such as DVD (Digital Versatile Disc) player or personal computer. When the picture signal is stored in the storage device such as a hard disk provided in the projector 10, the picture signal acquisition section 11 may acquire picture signal from the storage device. As described above, in this example, it is assumed that the picture signal which the picture signal acquisition section 11 acquires is a picture signal (hereinafter, referring to as 3D picture signal) displaying a 3D picture. The 3D picture signal acquired by the picture signal acquisition section 11 is inputted to the picture signal processing section 12.

The picture signal processing section 12 performs various processes with respect to the picture signal inputted from the picture signal acquisition section 11. The process that the picture signal processing section 12 includes process of separating the picture signal of each color of RGB in picture signal inputted from the picture signal acquisition section 11 and supplying the separated picture signal to light valves 100R, 100G and 100B of the picture projection section 14. Further, the picture signal processing section 12 creates a writing start signal (referred to as start pulse) indicating a timing (that is, a scanning start timing of light valves 100R, 100G and 100B) when writing data of each image consisting of picture indicated by the picture signal to light valves 100R, 100G and 100B and then supplies to the lamp drive section 13 and the synchronization signal creation section 15. Further, a period from writing start of an image data to writing start of a next image data refers to a frame interval. The writing start signal is an example of a signal indicating a display period of the right eye image and the left eye image of a 3D picture.

The lamp drive section 13 creates a lamp drive current that drives the lamp unit 2102 of the picture projection section 14, based on the writing start signal supplied from the picture signal processing section 12. An explanation of the creation of lamp drive current will be described later.

A configuration of the picture projection section 14 is illustrated by an example in FIG. 2. The picture signal of RGB inputted to the picture projection section 14 from the picture signal processing section 12 uses for control of light valves 100R, 100G and 100B of the picture projection section 14 and the picture projection section 14 projects picture according to the picture signal to the screen SC. Since the picture signal supplied to the picture projection section 14 from the picture signal processing section 12 is a 3D picture signal, the picture projection section 14 performs a time division of the right eye image and the left eye image including image indicating by 3D picture signal and projects them to the screen SC to alternately display on the screen SC.

The synchronization signal creation section 15 creates a shutter synchronization signal, based on the writing start signal supplied from the picture signal processing section 12. Herein, the shutter synchronization signal is a signal indicating a control timing when controlling the right eye shutter 206R and the left eye shutter 206L of the glasses 20 so that the right eye shutter 206R of the glasses 20 is in an opened state and the left eye shutter 206L is in a closed state when the right eye image is displayed in the screen SC and the right eye shutter 206R of the glasses 20 is in the closed state and the left eye shutter 206L is in the opened state when the left eye image is displayed on the screen SC (that is, to open and close the shutters 206R and 206L in synchronization with image displayed on the screen SC). The shutter synchronization signal may be a signal indicating both sides of a timing which the shutters 206R and 206L stands in the opened state and a timing which the shutters stands in the closed state. Alternatively, when the shutters 206R and 206L are set so that the closed (or opened) state becomes after lapse of a predetermined time after the opened (or closed) state becomes, the shutter synchronization signal may be a signal indicating only the timing that the shutters 206R and 206L stands in the opened (or closed) state.

The infrared ray emission section 16 has an infrared ray emission element such as LED (Light Emitting Diode) for example, and transmits the shutter synchronization signal created by the synchronization signal creation section 15 through the infrared transmission to the glasses 20. The infrared ray emission section 16 is installed as a separate body from the main body of the projector 10 and may be connected through wire or wireless to the main body of the projector 10. In such a case, the infrared ray emission section 16 is disposed to face toward user confronting the screen SC near the screen SC and the shutter synchronization signal sent from the infrared ray emission section 16 may be received by the infrared ray receiving section 204 of the glasses 20 which wears by a user. Alternatively, it is preferable such that the infrared ray emission section 16 is integrally installed with the main body of the projector 10 and the shutter synchronization signal is transmitted from the infrared ray emission section 16 toward the screen SC and the shutter synchronization signal reflected by the screen SC is received by the infrared ray receiving section 204 of the glasses 20. The synchronization signal creation section 15 and the infrared ray emission section 16 are an example of the synchronization signal transmission section of the invention.

The glasses 20 have a shutter drive section 210 in addition to the infrared ray receiving section 204 and the shutters 206R and 206L which are shown in FIG. 3. The function of the shutter drive section 210 may be realized by executing a program stored in the storage device such as ROM or flash memory by an operation process device such as CPU.

The shutter drive section 210 performs the opening and closing operation of the shutters 206R and 206L of the glasses 20, based on the shutter synchronization signal received by the infrared ray receiving section 204. The shutter drive section 210 stops the opening and closing operation of the shutters 206R and 206L when the shutter synchronization signal is not received by the infrared ray receiving section 204 (shutters 206R and 206L are in the opened state).

Figure 5:
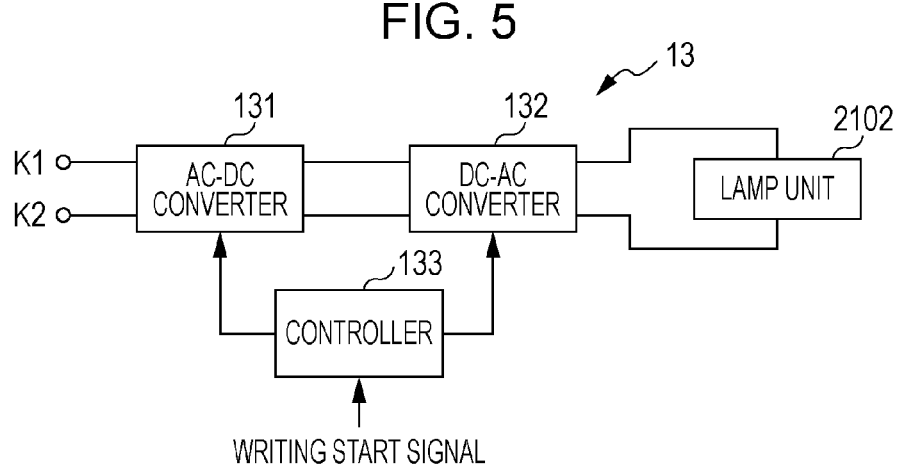
FIG. 5 is a block diagram illustrating a configuration of a lamp drive section.

FIG. 5 shows a block diagram illustrating a configuration of the lamp drive section 13. The lamp drive section 13 has a AC-DC converter 131, a DC-AC converter 132 and a controller 133. The controller 133 may be an operation processing device executing a program stored in a storage device such as a ROM. The AC-DC converter 131 has input terminals K1 and K2 to which an AC power supply voltage, which is not shown in the drawing, is applied and creates a direct current of the size depending on a control signal from the controller 133. The AC-DC converter 131 may include a rectifying bridge in which the AC power supply voltage applied to input terminals K1 and K2 is converted to direct current in similar manner to the unit I which is shown in FIG. 2 of JP-T-10-501919, for example, and a down converter (DC-DC converter) in which the magnitude of the direct current outputted from the rectifying bridge is converted according to a control signal from the controller 133.

The DC-AC converter 132 converts the direct current supplied from the AC-DC converter 131 to AC lamp drive current and supplies the converted current to the lamp unit 2102. The DC-AC converter 132 may be a bridge circuit which consists of switching elements such as transistors or thyristors, for example. The on/off timing of the switching element is controlled by the control signal from the controller 133 and thereby, a period or phase (that is, polarity switching timing) of the AC lamp drive current outputted from the DC-AC converter 132 is controlled. The DC-AC converter 132 may be a circuit configuration similar to a unit II shown in FIG. 2 of the JP-T-10-501919, for example.

The controller 133 creates a control signal for operating on/off switching element of the bridge circuit which is included in the DC-AC converter 132 such that the AC lamp drive current which is synchronized with the writing start signal (start pulse) inputted from the picture signal processing section 12 is supplied to the lamp unit 2102. Further, the controller 133 creates a control signal for controlling an output current of the AC-DC converter 131 such that the lamp drive current has a peak (current pulse) where only a predetermined delay time is out of phase with respect to the writing start signal.

Figure 6:
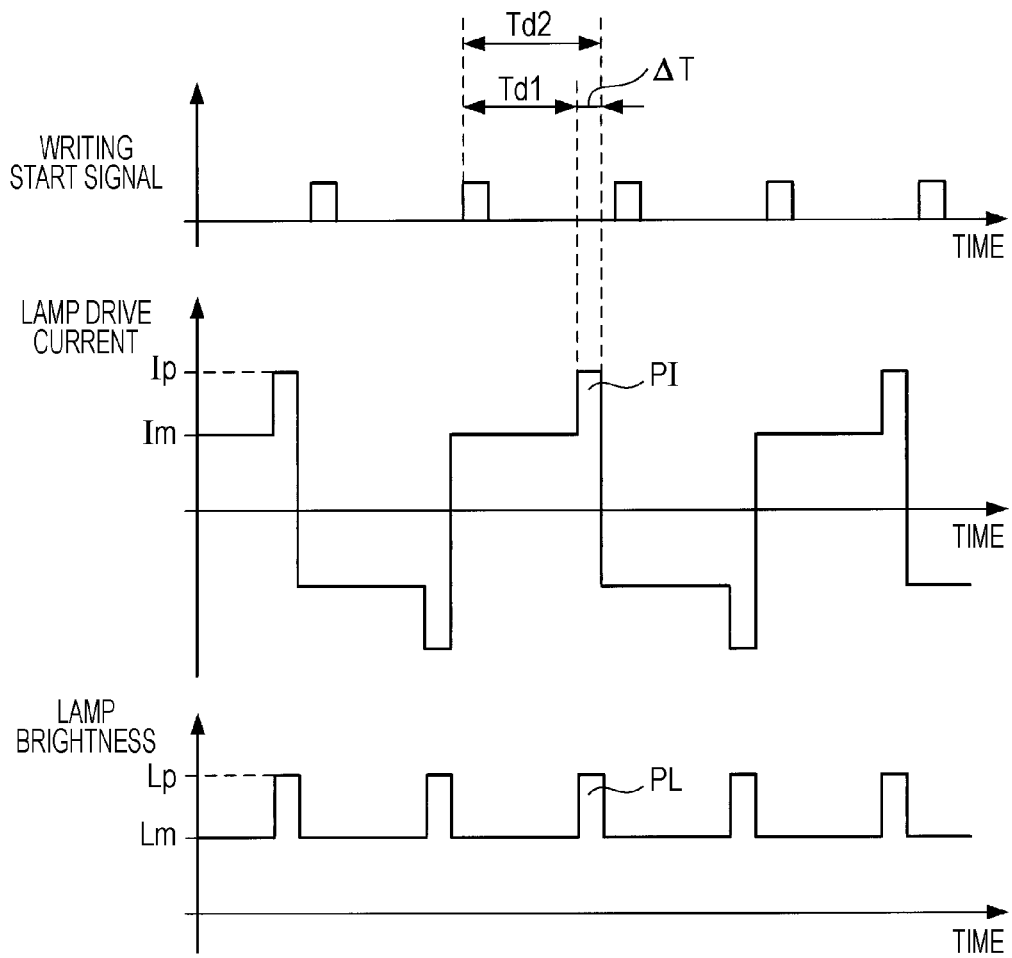
FIG. 6 is a graph illustrating an example of writing start signal, lamp drive current and lamp brightness.

FIG. 6 shows a graph illustrating an example of the lamp drive current and the lamp brightness. As shown in FIG. 6, the writing start signal is a pulse train having a predetermined period corresponding to one frame period. The lamp drive current supplied to the lamp unit 2102 from the DC-AC converter 132 is a current in which a pulse formed-current (hereinafter, refer to as a current pulse) PI of the same polarity as the half wave at the time of half wave termination of each polarity of AC current with square wave form in which an amplitude is I m and in which has a period corresponding to the writing start signal is overlapped and has a peak amplitude Ip in a portion that the current pulse PI is overlapped. Like that, by overlapping the current pulse PI to AC current, temperature of electrode rises and a stability of the electric discharge ark increases (for example, refer to JP-T-10-501919). In this example, the current pulse PI has a phase delayed by only the first delay time Td1 with respect to the writing start signal and a pulse width ΔT.

The lamp drive current shown in FIG. 6, under the control of controller 133, operates on/off a switching element of the bridge circuit included in DC-AC converter 132, in the timing delayed by the second delay time Td2=Td1+ΔT from the writing signal to create AC current of square wave form by which a polarity is switched in a timing delayed by a second delay time Td2=Td1+ΔT from writing signal and also to create volume of output current of AC-DC convertor 131 by increasing by a period ΔT predetermined corresponding to the pulse width in a timing delayed by the first delay time Td1 display system from writing signal. That is, the first delay time Td1 indicates a creation timing of the current pulse (peak) in lamp drive current and the second delay time Td2 indicates a timing in which polarity of the lamp drive current is switched over. The controller 133 adjusts the first delay time Td1 by adjusting the creation timing of the control signal to the AC-DC converter 131 and adjusts the second delay time Td2 by adjusting the creation timing of the control signal to the DC-AC converter 132.

In a case where the lamp drive signal as mentioned above is supplied, the strength (referred to as a lamp brightness) of the light created from the lamp unit 2102 is represented with a graph in the lowest stage of FIG. 6. The lamp brightness changes according to the volume (absolute value) of current supplied to the lamp unit 2102. As shown in the drawing, the lamp brightness has a pulse PL (referred to as a lamp brightness pulse) of the peak value Lp corresponding to the current pulse PI of lamp drive current. Further, the lamp brightness has substantially constant value Lm corresponding to the AC current with square wave form in a case where the current pulse PI is not overlapped in a portion between adjacent lamp brightness pulses PL.

Figure 7:
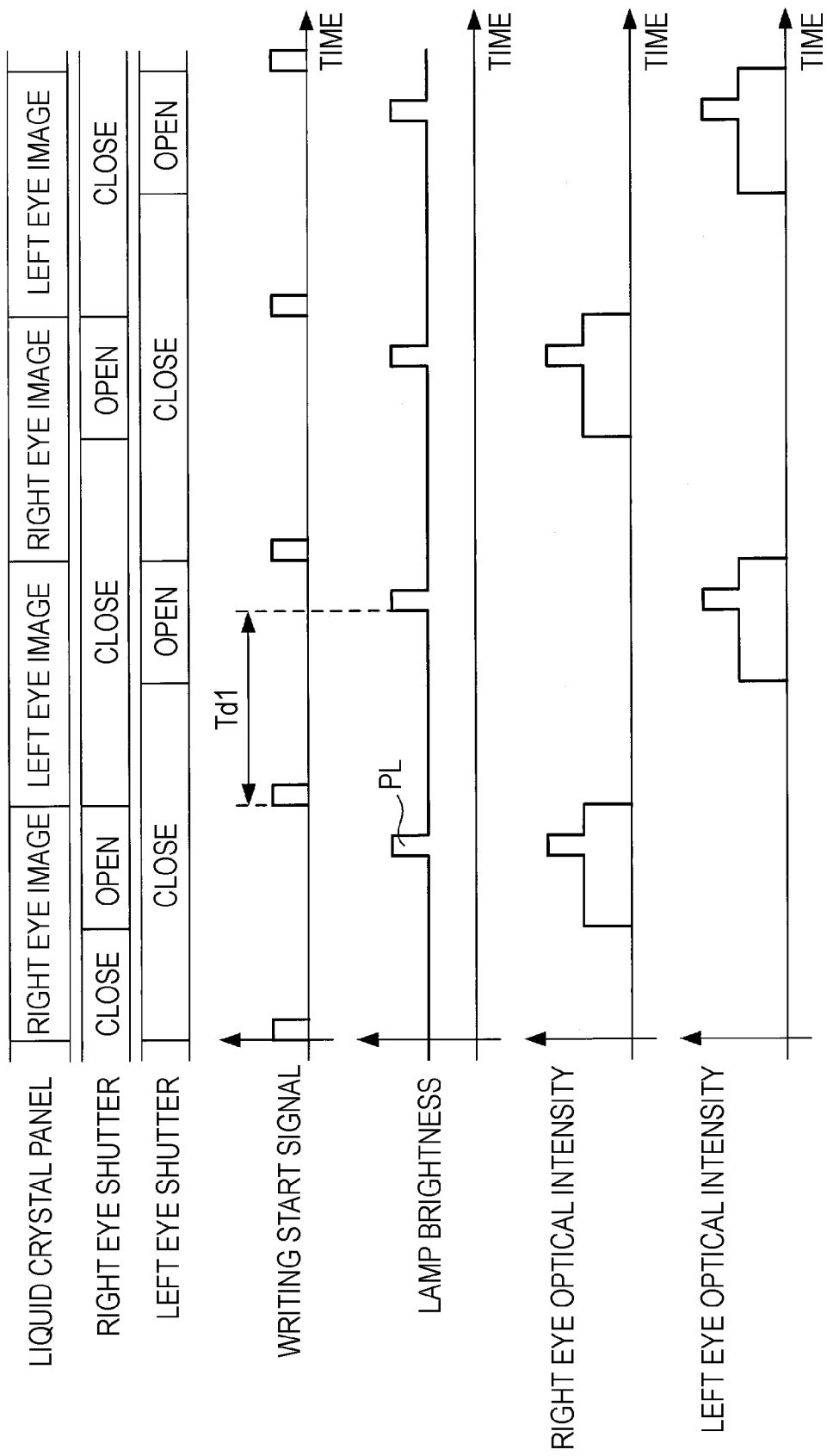
FIG. 7 is a diagram illustrating the creation timing of lamp brightness pulses with respect to an operation of each section of the display system in the embodiment.

FIG. 7 shows a diagram illustrating creation timing of lamp brightness pulse PL with respect to operation of each section of the display system 1 in the embodiment. Further, in description in below, in a case where there is no need to distinguish the liquid crystal panels (light valves) 100R, 100G and 100B from each other, they are collectively referred to as a liquid crystal panel 100. As shown in FIG. 7, the right eye image and the left eye image are alternately displayed on the liquid crystal panel 100 in the predetermined period (frame period). The writing to liquid crystal panel 100 of data (referred to as a image data) representing each image displayed on the liquid crystal panel 100 is started corresponding to the creation of the writing start signal (start pulse). Herein, because it takes a predetermined time to writing the image data for one image to the liquid crystal panel 100, the period from a certain writing start signal creation until the writing of the image data corresponding to the writing start signal is finished is that a part of the new image (for example, a right eye image) corresponding to the pixel that the writing is finished and a part of the previous image (for example, a left eye image) corresponding to the pixel that the writing is not finished are mixed and displayed.

The right eye shutter 206R of glasses 20 is controlled to be opened when the right eye image is displayed on liquid crystal panel 100 and the left eye shutter 206L is controlled to be opened when the left eye image is displayed on liquid crystal panel 100, based on the shutter synchronization signal transmitted from projector 10. More specifically, the right eye shutter 206R is controlled to be opened in the later half portion of the frame period in which the right eye image is displayed and to be closed during the remaining period. The left eye shutter 206L is controlled to be opened in later half portion of the frame period in which the left eye is image displayed and to be closed in the remaining period. The control of the right eye shutter 206R and the left eye shutter 206L like that, for example, in the synchronization signal creation section 15 of the projector 10 is realized by creating the shutter synchronization signal delayed by the predetermined delay time (in this example, a half of the frame period) from the writing start signal and by transmitting the created signal through the infrared ray emission section 16 to the glasses 20.

As described above, during a predetermined period from the start of each image frame period, a part of the right eye image and a part of the left eye image are mixed and displayed. Because of that, if during that period, the right eye shutter 206R or the left eye shutter 206L is in an opened state, the right eye image and the left eye image arrive at the right eye or the left eye (that is, crosstalk occurs) of the user without separating the right eye image and the left eye image. By making such a way that the right eye shutter 206R and the left eye shutter 206L be in an opened state only in a later half portion of the frame period of the corresponding image, the right eye shutter 206R or the left eye shutter 206L being in an opened state during a period in which a part of right eye image and a part of the left eye image are mixed and displayed and the right eye image and the left eye image arrives to the right eye or the left eye of the user without separating of the right eye image and the left eye image is prevented. Further, which part of the frame period of corresponding image allows the right eye shutter 206R and the left eye shutter 206L to be in the opened state may be adjusted depending on the time required to the writing of image data and is not limited to the later half portion. For example, in a case where the writing of image data terminates in a quarter time of the frame period, the right eye shutter 206R and the left eye shutter 206L may be in the opened state during the remaining period (that is, three quarter period before the termination of the frame period). In other words, the right eye shutter 206R and the left eye shutter 206L may stand in the opened state in a part of frame period so that the right eye shutter 206R or left eye shutter 206L does not become the opened state during the period when a part of the left eye image and a part of the right eye image are mixed and is displayed.

As shown in FIG. 7, in the embodiment, the lamp brightness pulse PL is overlapped with the period when the right eye shutter 206R is opened and the period when the left eye shutter 206L is opened. As described with reference to FIG. 6, the lamp brightness pulse PL corresponds to the current pulse PI in the lamp drive current supplied to the lamp unit 2102. That is, the first delay time Td1 which is a delay time of current pulse PI with respect to the writing start signal is adjusted so that the current pulse PI (that is, the peak of the lamp drive current) is overlapped with the period when the right eye shutter 206R is opened and the period when the left eye shutter 206L is opened and thereby, the controller 133 of the lamp drive section 13 shown in FIG. 5 creates AC lamp drive current in which the current pulse PI is overlapped, based on the first delay time Td1 that is set like that. In other words, the lamp drive section 13 supplies the lamp driving current having the current pulse PI overlapping with period in which the right eye shutter 206R is opened and the current pulse PI overlapping with period in which the left eye shutter 206L is opened to the lamp unit 2102. Further, the second delay time Td2 indicating a polarity switching timing of lamp drive current is set, based on the first delay time Td1 and the width ΔT of the current pulse PI so that the current pulse PI of lamp drive current is created at the termination portion of the half wave of each polarity of lamp drive current.

In FIG. 7, right eye optical intensity and left eye optical intensity indicate the optical intensity passed through the right eye shutter 206R and the left eye shutter 206L of the glasses 20 disposed toward the screen SC when displaying a predetermined common image (for example, image of the full-screen white) as the right eye image and the left eye image on the screen SC under control of the liquid crystal panel 100. The right eye optical intensity is substantially proportional to the product of transmissivity of the right eye shutter 206R and the lamp brightness, and the left eye optical intensity is substantially proportional to the product of transmissivity of the left eye shutter 206L and the lamp brightness. Herein, for simplicity, it is assumed that the transmissivity in the opened state of the right eye shutter 206R and the left eye shutter 206L is constant. As shown in drawing, the right eye optical intensity is substantially zero during the closing period of the right eye shutter 206R, and has a substantially constant value in a portion that is not overlapped with the lamp brightness pulse PL, and the pulse-shape value increases in a portion which is overlapped with the lamp brightness pulse PL during the opening period of the right eye shutter 206R. Similarly, the left eye optical intensity is substantially zero during the closing period of the left eye shutter 206L, and has substantially constant value in a portion that is not overlapped with lamp brightness pulse PL during the opening period of the left eye shutter 206L, and the pulse-shape value is increased in a portion which is overlapped with lamp brightness pulse PL.

Figure 8:
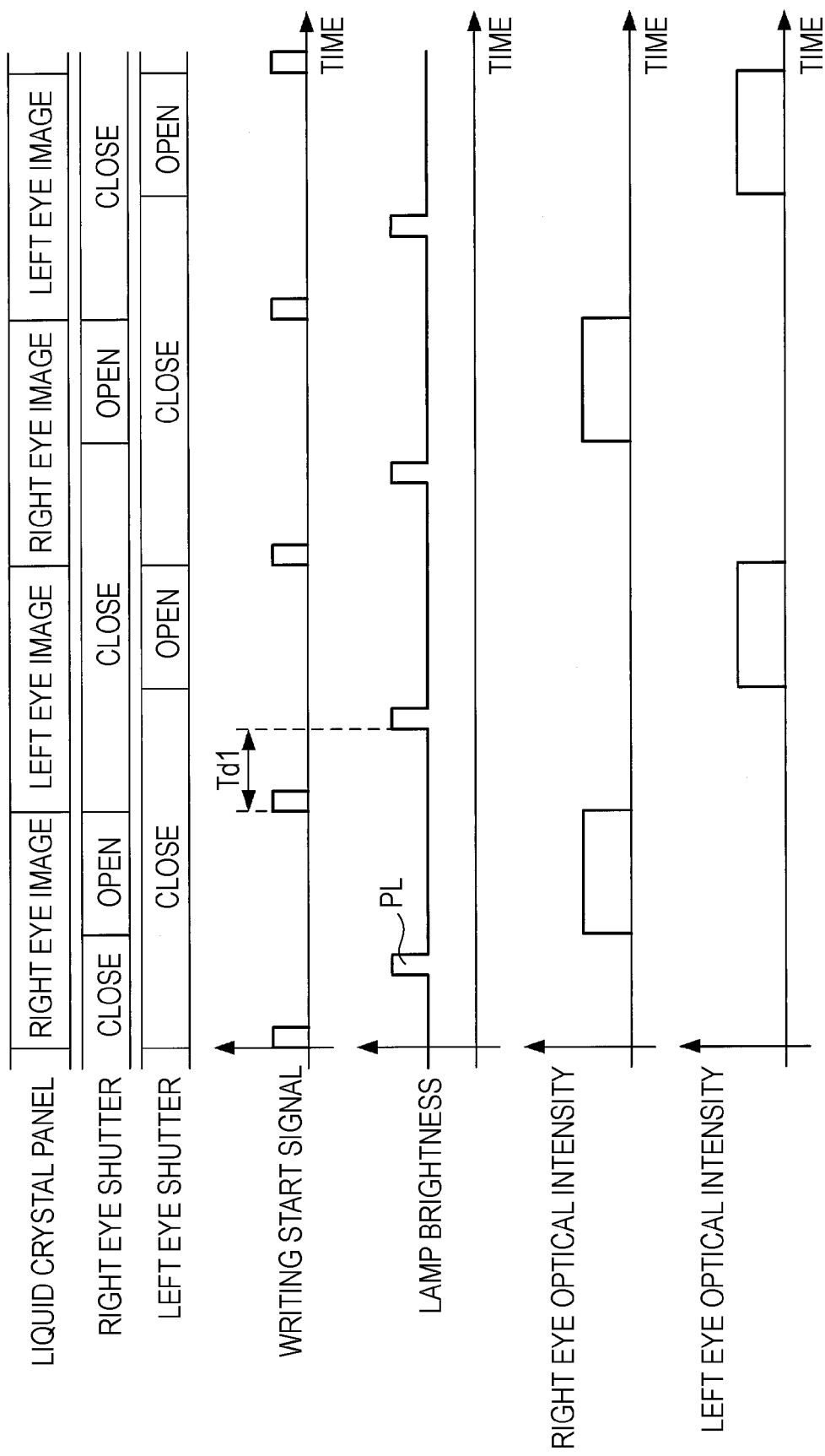
FIG. 8 is a diagram illustrating creation timing of lamp brightness pulses with respect to an operation of each section of the display system in a comparative example.

FIG. 8 shows a diagram illustrating a creation timing of the lamp brightness pulse PL with respect to the operation of each section of the display system 1 in a comparative example. In the example shown in FIG. 8, a point that neither a period in which the right eye shutter 206R is opened nor a period in which the left eye shutter 206L is opened is overlapped is different from the example shown in FIG. 7. Because of that, in the example shown in FIG. 8, the right eye optical intensity and the left eye optical intensity are substantially constant value that there is no a portion that the pulse-shape value is increased during the period which the right eye shutter 206R is opened and the left eyes shutter 206L is opened.

The brightness of the image which user who wears the glasses 20 and enjoys the image that is projected on screen senses depends on a value (that is, time average) which is obtained by a integrating for optical intensity (that is, right eye optical intensity and left eye optical intensity) passing through the right eye shutter 206R and the left eye shutter 206L during each frame period (an example of a predetermined period). Accordingly, in the example shown in FIG. 8, compared to the example shown in FIG. 7, the time-integrating value for optical intensity is small as much as there is not a part increasing into pulse form corresponding to lamp brightness pulse PL in the right eye optical intensity and the left eye optical intensity, and the brightness of the image which the user who wears the glasses 20 senses decreases. In other words, in the embodiment shown in FIG. 7, because the phase (that is, first delay time Td1 for the writing start signal) of the peak of the lamp driving current is set so that a peak (current pulse PI) of the lamp driving current is overlapped with the period when the right eye shutter 206R is opened and the period when left eye shutter 206L is opened, the brightness of an image viewed through the glasses 20 by a user is improved in comparison to the case that a peak of the lamp driving current is not overlapped with neither a period when the right eye shutter 206R is opened nor a period when the left eye shutter 206L is opened.

In the example shown in FIG. 7 and FIG. 8, for simplicity, it is assumed that the transmissivity in the opened state of the right eye shutter 206R and the left eye shutter 206L is constant. However, in actual practice, the transmissivity in the opened state of the right eye shutter 206R and the left eye shutter 206L is not constant but changes.

Figure 9:
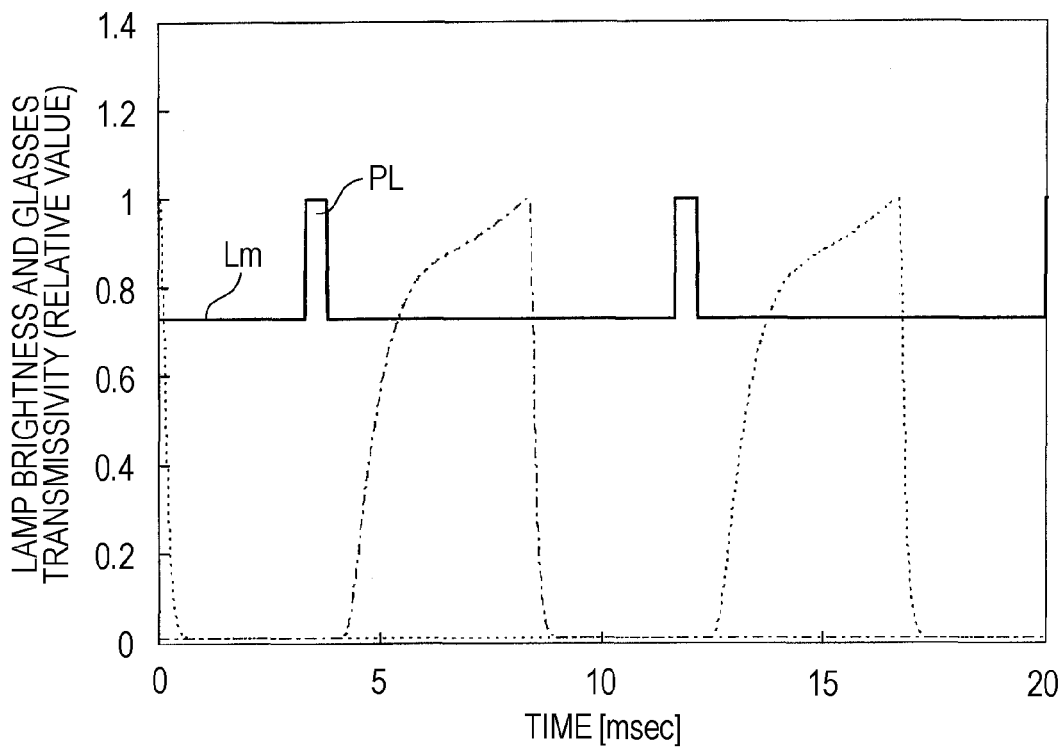
FIG. 9 is a diagram illustrating the transmissivity of the glasses and the lamp brightness in a comparative example.

FIG. 9 shows a diagram illustrating a transmissivity of the glasses 20 and lamp brightness in the comparative example. In FIG. 9, the solid line indicates lamp brightness and the peak value is relatively indicated as 1. Further, the dotted line indicates the transmissivity of the right eye shutter 206R and indicates relatively its maximum value as 1. Similarly, one dot and dashed line relatively indicates transmissivity of the left eye shutter 206L and indicates its maximum value as 1. In FIG. 9, when the transmissivity of the right eye shutter 206R and the left eye shutter 206L is greater than a predetermined value (for example, relative value is 0.1), it is said that the right eye shutter 206R or the left eye shutter 206L is in an opened state. As shown in drawing, in the opened state, after each transmissivity of the right eye shutter 206R and the left eye shutter 206L gently rises up for a while, after initially rising rapidly. And then, after instructing a state change into a closing state, the transmissivity rapidly drops. That is to say, a square wave represents a corrupted shape. Similarly, the transmissivity of the right eye shutter 206R and the left eye shutter 206L changes in non-uniformly in the opened state. In the example shown in FIG. 9, the lamp brightness pulse PL does not overlap with either a period in which the right eye shutter 206R is opened or a period in which the left eye shutter 206L is opened.

Figure 10:
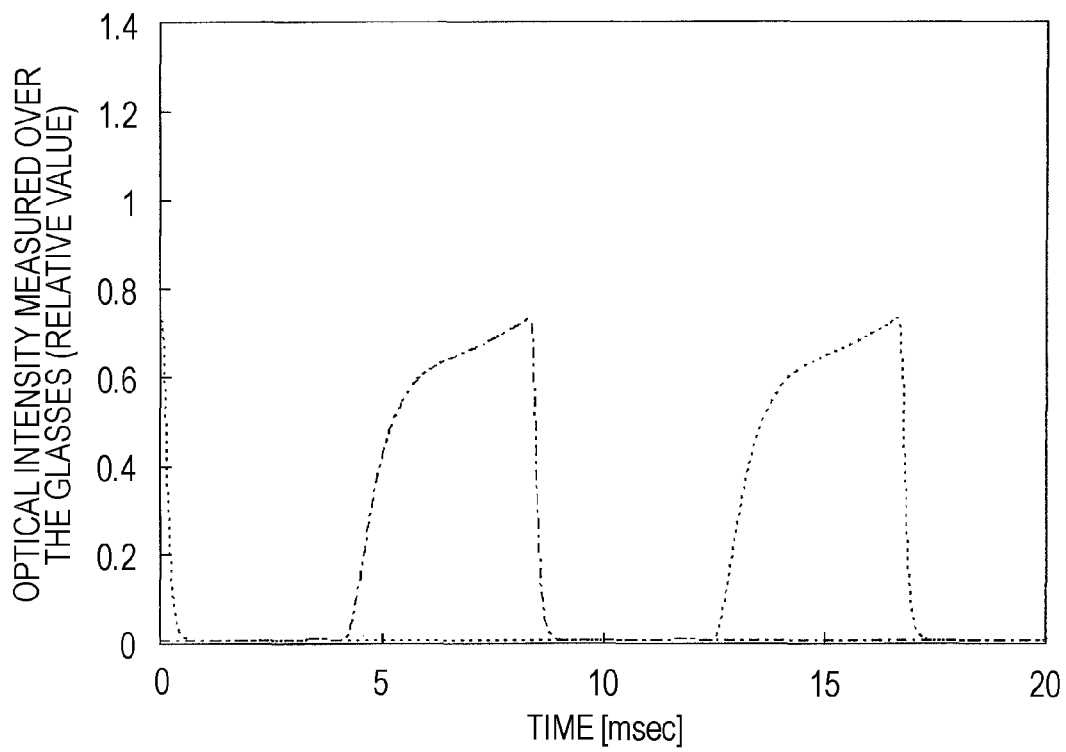
FIG. 10 is a diagram illustrating an optical intensity measured over the glasses in an example shown in FIG. 9.

FIG. 10 shows a diagram illustrating an optical intensity measured over the glasses 20 in the example shown in FIG. 9. Herein, the optical intensity measured over the glasses 20 is the optical intensity passing through the right eye shutter 206R and the left eye shutter 206L of the glasses 20 which are disposed toward the screen SC when the liquid crystal panel 100 is controlled and a common image (for example, an image of the full-screen white color) determined in advance as a right eye image and a left eye image in the screen SC is displayed, in the same manner that has been described with reference to FIG. 7 and FIG. 8. In FIG. 10, the dotted line indicates an optical intensity passed through the right eye shutter 206R and one dot and dashed line indicates an optical intensity passed through the left eye shutter 206L. The optical intensity relatively indicates the optical intensity measured when a relative value of the transmissivity of the shutter is 1 while the relative value of lamp brightness is 1, as 1. The optical intensity passed through the right eye shutter 206R is substantially proportional to the product of transmissivity of the right eye shutter 206R and the lamp brightness and the optical intensity passed through the left eye shutter 206L is substantially proportional to the product of transmissivity of the left eye shutter 206L and the lamp brightness. As described above, in the example shown in FIG. 9, the lamp brightness pulse PL does not overlap with either a period in which the right eye shutter 206R is opened or a period in which the left eye shutter 206L is opened, because of that, the optical intensity measured over the glasses 20 shown in FIG. 10 becomes a wave form that there is no portion increasing in pulse form corresponding to the lamp brightness pulse PL.

Figure 11:
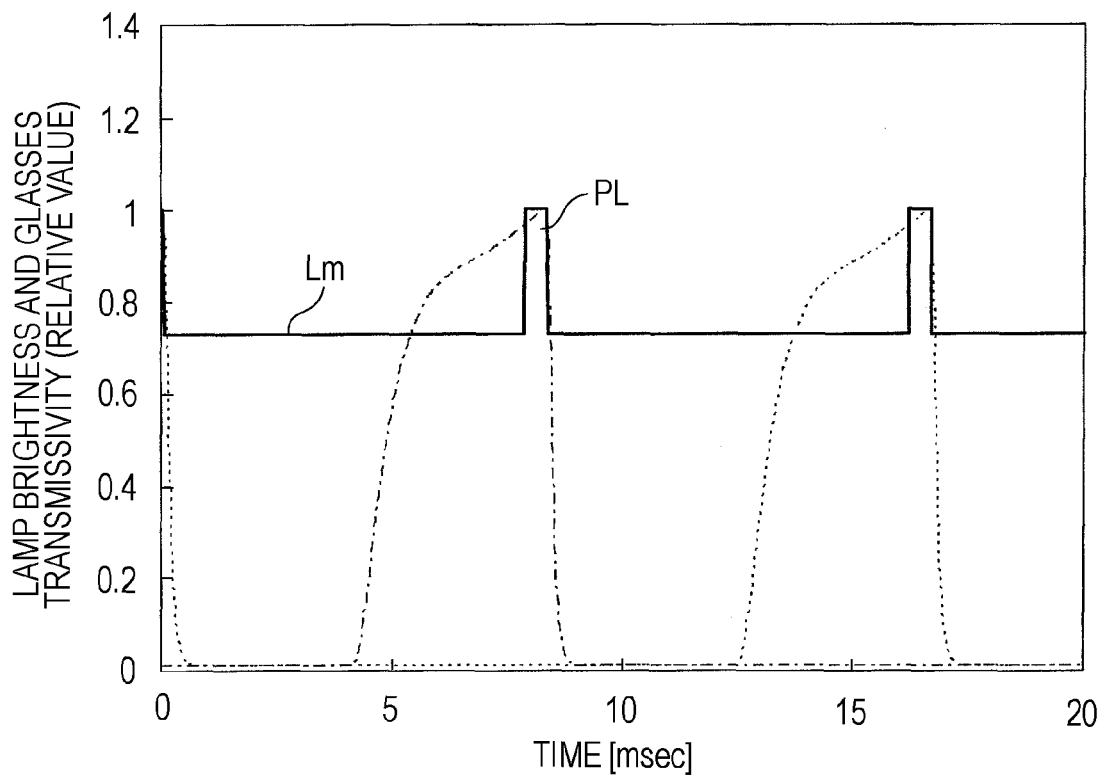
FIG. 11 is a diagram illustrating the transmissivity of the glasses and the lamp brightness in the embodiment.
Figure 12:
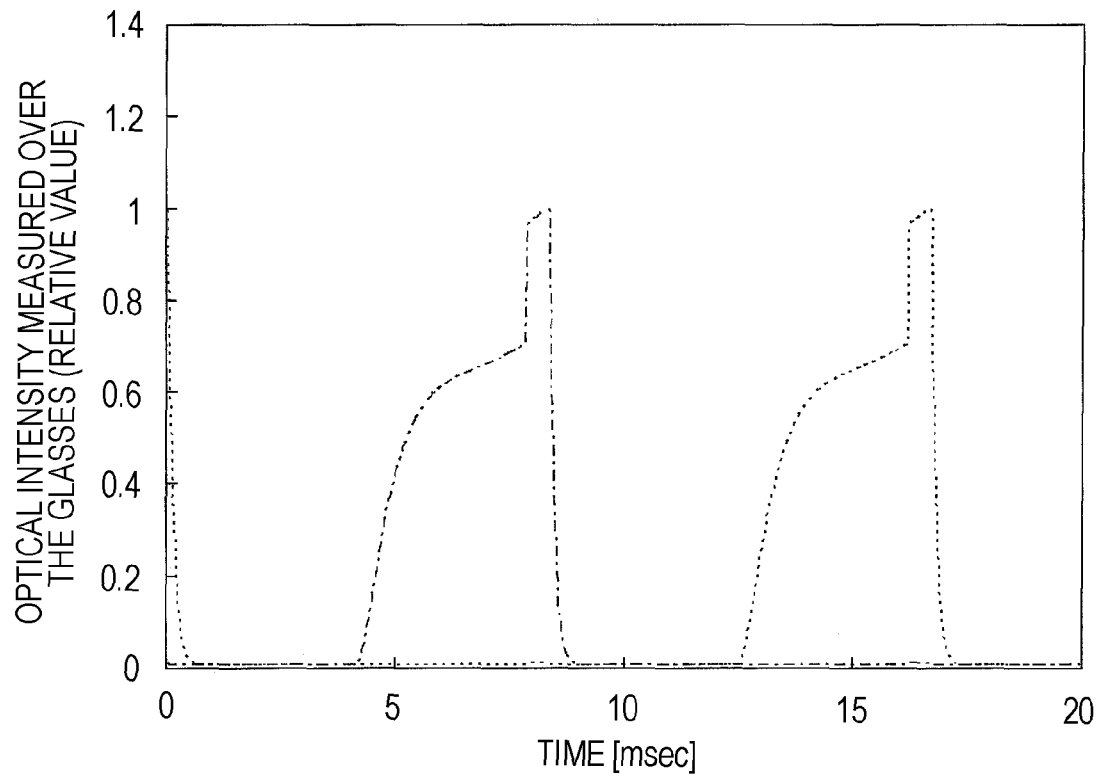
FIG. 12 is a diagram illustrating the optical intensity measured over the glasses of an example in shown in FIG. 11.

FIG. 11 shows a diagram illustrating a transmissivity of the glasses 20 and the lamp brightness in an embodiment. FIG. 12 shows a diagram illustrating an optical intensity measured over the glasses 20 in the example shown in FIG. 11. In example of FIG. 11, the lamp brightness pulse PL is different from FIG. 9 in that the opening period of the right eye shutter 206R and the opening period of the left eye shutter 206L overlap. More specifically, in the example of FIG. 11, a point that the transmissivity of the right eye shutter 206R or the transmissivity of the left eye shutter 206L becomes the maximum substantially accords with falling of the lamp brightness pulse PL. As a result, as shown in FIG. 12, the optical intensity measured over the glasses 20 stands for a wave form having a portion increasing in pulse form corresponding to the lamp brightness pulse PL. Thereby, if it is assumed that the value obtained by integrating the optical intensity measured over the glasses 20 shown FIG. 10 over one frame period is 100, the value obtained by integrating the optical intensity measured over the glasses 20 shown in FIG. 12 over one frame period is 105.6 and increases by 5.6%. That is, the brightness of image viewed through the glasses 20 by a user increases by 5.6%.

2. Another Embodiment

The invention is not limited to the embodiment described above, various modifications of the embodiment can be realized. The Modification Example will be described hereinafter. Among the modification embodiments in below, two or more modification examples may be combined.

2-1. Modification Example 1

In the example illustrating in FIG. 11 and FIG. 12 of the above the embodiment, the point that the transmissivity of the right eye shutter 206R or the transmissivity of the left eye shutter 206L becomes the maximum value substantially accords with falling of the lamp brightness pulse PL, but the invention is not limited thereto. If the opening period of the right eye shutter 206R and the opening period of the left eye shutter 206L overlap each other, the creation timing of lamp brightness pulse PL (that is, creation timing of current pulse PI) may be changed variously.

Figure 13:
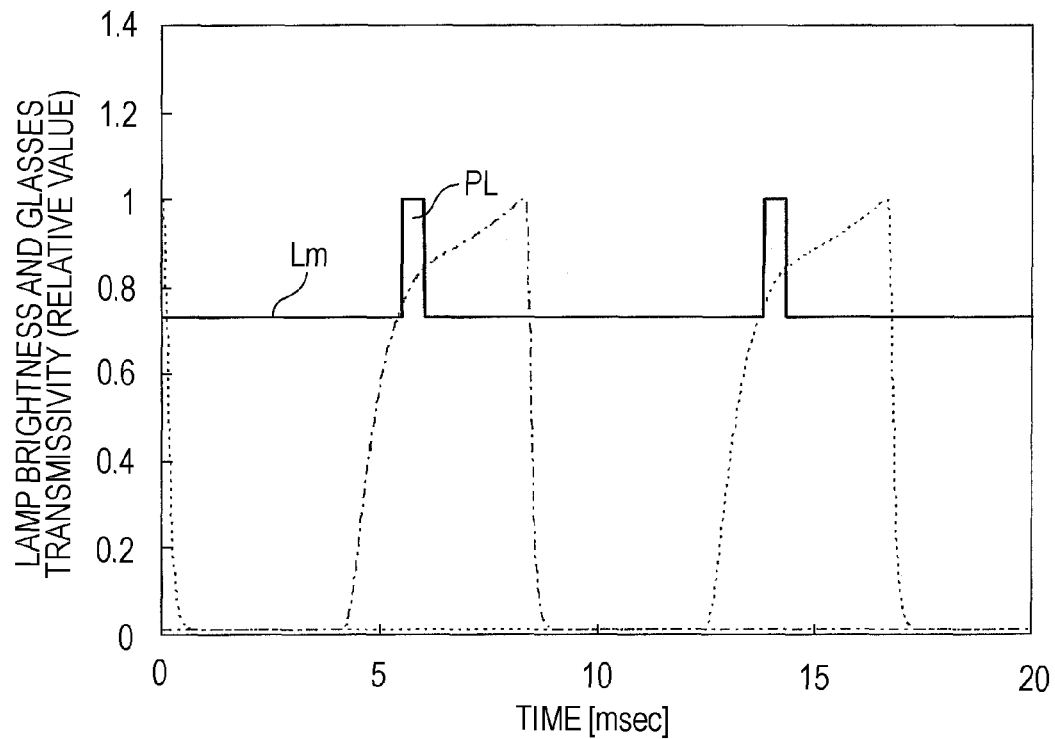
FIG. 13 is a diagram illustrating the transmissivity of the glasses and the lamp brightness in Modification Example 1.
Figure 14:
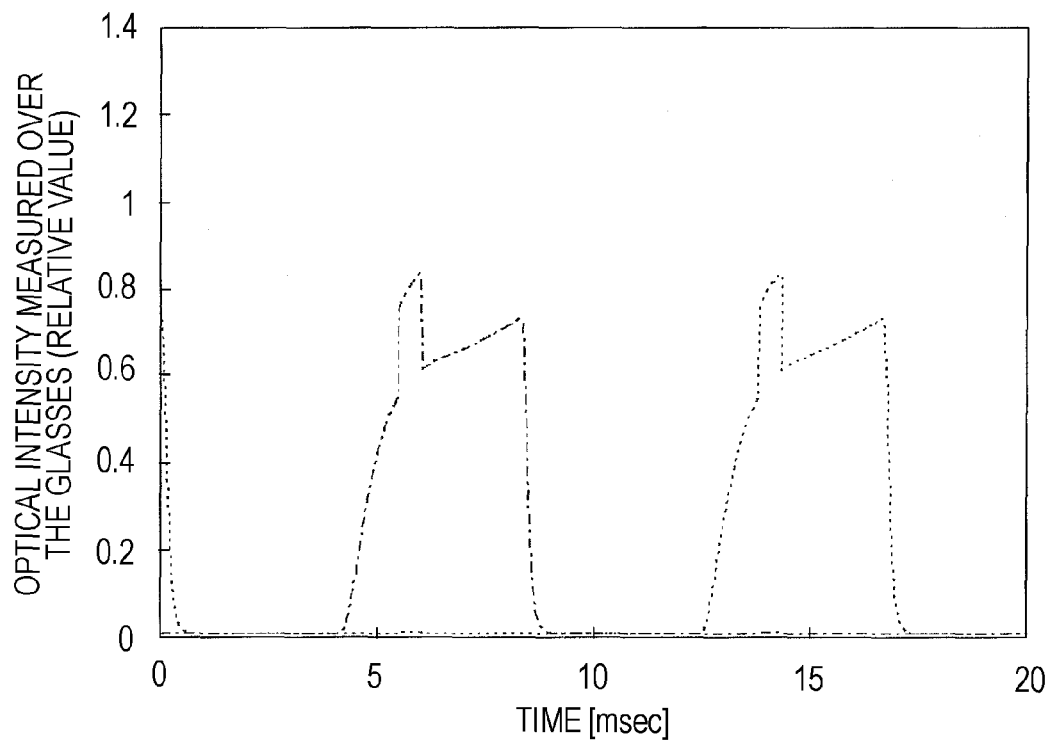
FIG. 14 is a diagram illustrating the optical intensity measured over the glasses in the example shown FIG. 13.

FIG. 13 shows a diagram illustrating transmissivity of the glasses 20 and lamp brightness related to the Modification Example 1. Further, FIG. 14 shows optical intensity measured over the glasses 20 in the example shown in FIG. 13. In example of FIG. 13, before when the transmissivity of the right eye shutter 206R or the left eye shutter 206L becomes a maximum value, at the time when the relative value of transmissivity is approximately 0.8, a point that a period in which the right eye shutter 206R is opened and a period in which the left eye shutter 206L is opened are overlapped is different from an example of FIG. 11. In such a case, as shown in FIG. 14, the optical intensity measured over the glasses 20 has a portion increasing in pulse form corresponding to the lamp brightness pulse PL. Thereby, if it is assumed that a value which optical intensity measured over the glasses 20 shown in FIG. 10 is obtained by integrating over one frame period is 100, a value that optical intensity measured over the glasses 20 shown in FIG. 14 is obtained by integrating over one frame period becomes 104.4 and increases by 4.4%. That is, brightness of image viewed through the glasses 20 by a user increases by 4.4%.

In example shown in FIG. 13 and FIG. 14, in comparison with a case where lamp brightness pulse PL is not overlap with none of the opening period of the right eye shutter 206R and opening period of the left eye shutter 206L, brightness of image viewed through the glasses 20 by a user increases. However, in the examples shown in FIG. 13 and FIG. 14, in comparison with examples shown in FIG. 11 and FIG. 12, the time-integrating value of one frame period of optical intensity measured over the glasses 20 is small. Like that, even though lamp brightness pulse PL is overlapped with a period in which the right eye shutter 206R is opened and a period in which the left eye shutter 206L is opened, by a phase relationship between the lamp brightness pulses PL, and a period in which the right eye shutter 206R is opened and a period in which the left eye shutter 206L is opened, the time-integrating value of one frame period of optical intensity measured over the glasses 20 changes. Accordingly, the phase (that is, phase of current pulse PI) of the lamp brightness pulse PL may be adjusted by the controller 133 of the lamp drive section 13 so that the time-integrating value of one frame period of the optical intensity measured over the glasses 20 grows big as much as possible. Further, the optical intensity measured over the glasses 20 is approximately proportional to the product of lamp brightness and transmissivity of shutters 20R and 20L of the glasses 20 as described above. Accordingly, the lamp drive current having a peak (current pulse PI) may be controlled by controller 133 so that the integral value of one frame period of the product of lamp brightness and transmissivity of shutters 20R and 20L of the glasses 20 becomes the maximum value.

2-2. Modification Example 2

Figure 15:
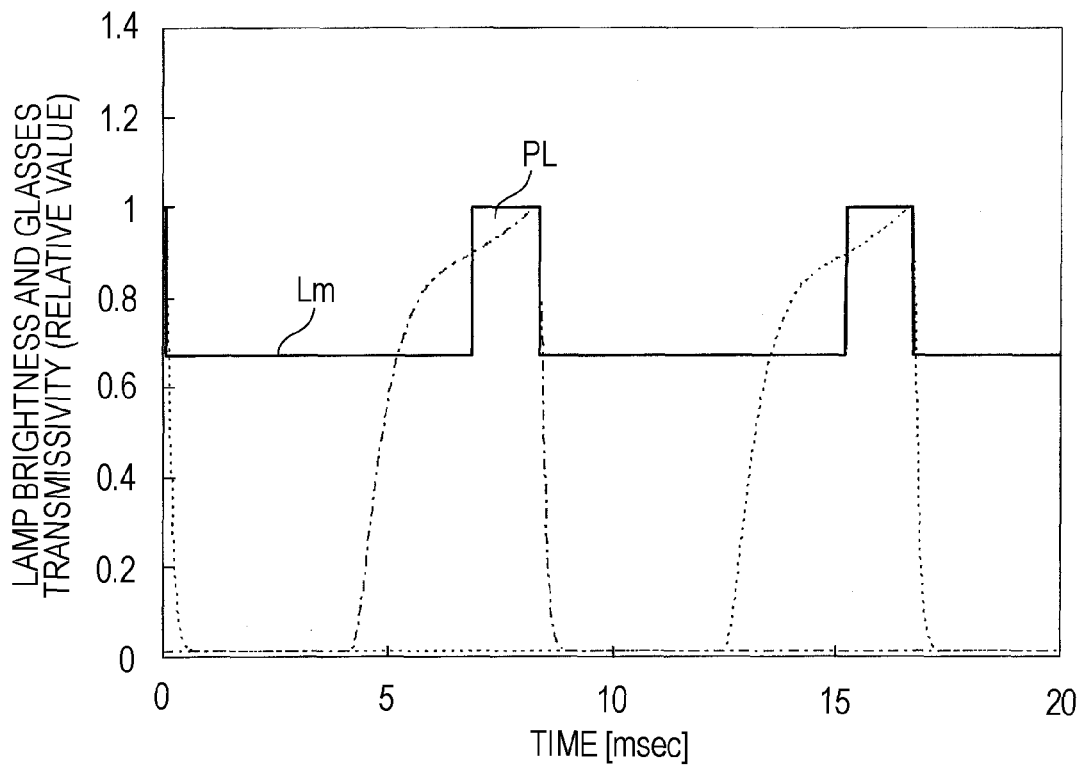
FIG. 15 is a diagram illustrating the transmissivity of the glasses and the lamp brightness in Modification Example 2.
Figure 16:
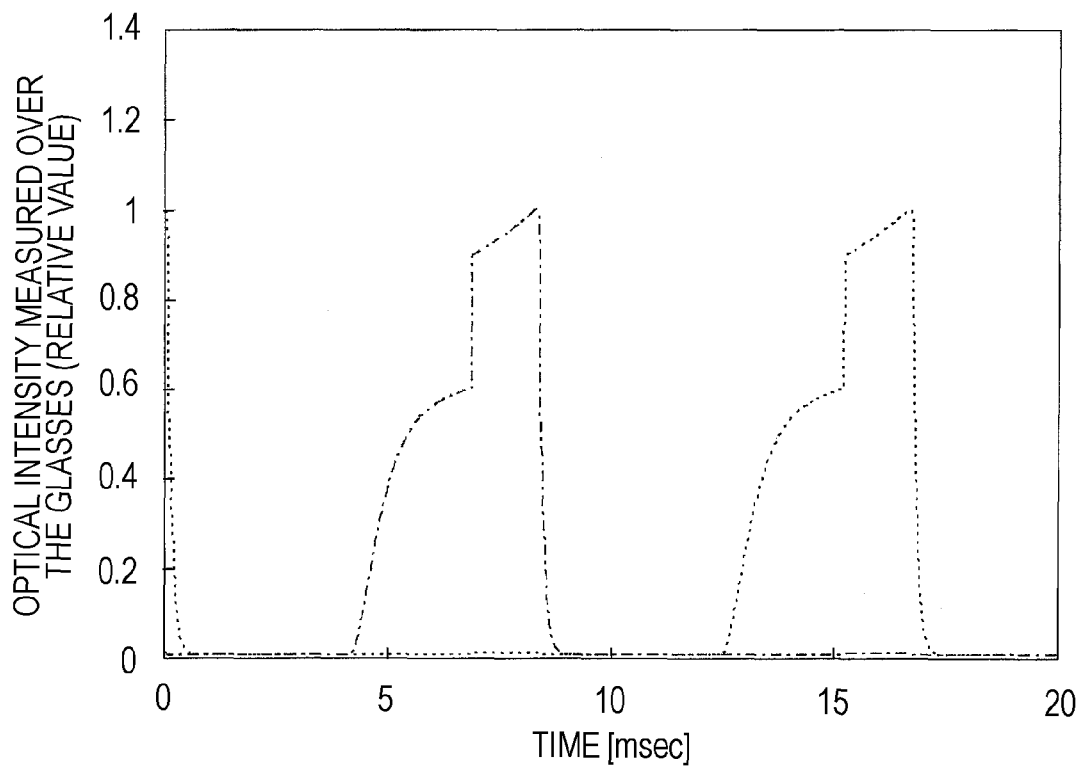
FIG. 16 is a diagram illustrating the optical intensity measured over the glasses in the example shown FIG. 15.

FIG. 15 shows a diagram illustrating a transmissivity of the glasses 20 and lamp brightness related to the Modification Example 2. Further, FIG. 16 shows an optical intensity measured over the glasses 20 in the example shown in FIG. 15. In the example of FIG. 15, the width (that is, width ΔT of the current pulse PI) of the lamp brightness pulse PL is wider (approximately, three times) than the width of the lamp brightness pulse PL shown in FIG. 11. In addition, it is different from the example shown in FIG. 11 in a point that a value (relative value for brightness Lp of lamp brightness pulse PL) of a substantially constant lamp brightness Lm in the part between the lamp brightness pulses PL next to each other is smaller than a value of lamp brightness Lm in the example shown in FIG. 11. In the example of FIG. 15, a point that the transmissivity of the right eye shutter 206R or the transmissivity of the left eye shutter 206L becomes the maximum value substantially accords with falling of the lamp brightness pulse PL in similar manner to the example shown in FIG. 11 substantially accords. As a result, as shown in FIG.

16, the optical intensity measured over the glasses 20 becomes a wave form having a portion increasing in a pulse form corresponding to the lamp brightness pulse PL. Thereby, if it is assumed that the value which the optical intensity measured over the glasses 20 shown in FIG. 10 is obtained by the integrating over one frame period is 100, a value that the optical intensity measured over the glasses 20 shown in FIG. 16 is obtained by a integrating over one frame period becomes 120.8 and increases 20.8%. The value is greater than the value 105.6 which the optical intensity measured over the glasses 20 shown in FIG. 12 corresponding to the example of FIG. 11 is obtained by integrating over one frame period.

Similarly, compared to the examples shown in FIG. 15 and FIG. 16 with the examples shown in FIG. 11 and FIG. 12, in spite of that a value of lamp brightness Lm in the part between the lamp brightness pulses PL next to each other decreases, the time-integrating value in one frame period of the optical intensity measured over the glasses 20 is improved by increasing the width of the lamp brightness pulse PL. Accordingly, improving of the brightness of image viewed through the glasses 20 by a user and suppressing of lamp consumed power are compatible. Further, by decreasing the lamp brightness Lm in the part between the lamp brightness pulses PL next to each other, the lamp brightness (that is, brightness of image which is displayed at that time) in a period in which all of the right eye shutter 206R and the left eye shutter 206L are in a closed state decreases compared to that in a period in which either of the right eye shutter 206R and the left eye shutter 206L is in an opened state. Thereby, a crosstalk created due to a limitation to an opening and closing speed (that is, response speed of liquid crystal) of the right eye shutter 206R and the left eye shutter 206L and the like is decreased compared to a case where the lamp brightness Lm in the period is not decreased.

2-3. Modification Example 3

In the above the embodiment, an ultra high pressure mercury lamp as a high pressure electric discharge lamp driven by an AC current has been used, the invention is not limited thereto. For example, the high pressure electric discharge lamp may be as a metal halide lamp. If driving current has the peak synchronized in a picture signal, and the brightness depended on volume of the driving current is a lamp emitting light, any lamp may be used.

2-4. Modification Example 4

In the above the embodiment, a shutter synchronization signal has been transmitted to the glasses 20 by infrared ray transmission by the infrared ray emission section 16, but the invention is not limited thereto. The shutter synchronization signal may be transmitted using a unit other than infrared ray transmission. For example, the shutter synchronization signal may be transmitted by the wireless.

2-5. Modification Example 5

In the above embodiment, the output current of the AC-DC convertor of the lamp drive section 13 has been controlled so that the current pulse PI of the lamp drive current creates in a termination portion of half wave of each polarity of the AC lamp drive current, the invention is not limited thereto. Output current of the AC-DC convertor of the lamp drive section 13 may be controlled so that the current pulse PI creates in a starting portion or a middle portion of half wave of each polarity of the AC lamp drive current. Further, the lamp drive current is not limited to that pulse is overlapped with AC current of square wave shape and may be AC current of triangular or sinusoidal wave shape.

2-6. Modification Example 6

In the above the embodiment, the projector 10 is a three panel type projector in which uses three light valves 100R, 100G and 100B, but the invention is not limited thereto. The projector 10 may be a single panel type projector in which uses one color liquid crystal panel having pixels of each color of RGB.

This application claims priority to Japan Patent Application No. 2011-211115 filed Sep. 27, 2011, the entire disclosures of which are hereby incorporated by reference in their entireties.

What is claimed is:
1. A projector comprising:
a lamp that emits projection light to project a 3-dimensional picture, in which a right eye image and a left eye image are presented in a time division manner, to an object;
a synchronization signal transmission section which transmits shutter synchronization signal to a pair of glasses having a right eye shutter and a left eye shutter which have transmissivity including first transmissivity and second transmissivity lower than the first transmissivity independently, to control the transmissivity of the right eye shutter and the left eye shutter, based on a signal indicating a displaying period of the right eye image and the left eye image of the 3-dimensional picture; and
a lamp drive section that supplies AC current to the lamp so that the lamp has a peak of lamp brightness when the transmissivity of the right eye shutter is the first transmissivity and when the transmissivity of the left eye shutter is the first transmissivity based on the signal indicating a displaying period of the right eye image and the left eye image of the 3-dimensional picture.

2. The projector according to claim 1, wherein a relative value of the first transmissivity is greater than 0.1, the relative value indicated relatively its maximum value as 1.

3. The projector according to claim 1, wherein a relative value of the first transmissivity is greater than 0.8, the relative value indicated relatively its maximum value as 1.

4. The projector according to claim 1, wherein the first transmissivity is the maximum value of the transmissivity of each the right eye shutter and the left eye shutter.

* * * * *